United States Patent [19]

Kaku et al.

[11] Patent Number: 4,751,695
[45] Date of Patent: Jun. 14, 1988

[54] METHOD AND APPARATUS FOR TRACKING SERVO SYSTEM

[75] Inventors: Toshimitsu Kaku, Sagamihara; Takeshi Maeda, Kokubunji; Kazuo Shigematsu, Kitakatsushika, all of Japan

[73] Assignee: Hitachi, Ltd., Tokyo, Japan

[21] Appl. No.: 870,944

[22] Filed: Jun. 5, 1986

[30] Foreign Application Priority Data

Jun. 5, 1985 [JP] Japan ................................ 60-120477
Aug. 23, 1985 [JP] Japan ................................ 60-184182

[51] Int. Cl.$^4$ ............................................ G11B 7/095
[52] U.S. Cl. ..................................................... 369/46
[58] Field of Search ...................... 369/44, 45, 46, 109, 369/110, 111, 124; 250/201

[56] References Cited

U.S. PATENT DOCUMENTS

| | | | |
|---|---|---|---|
| 4,467,462 | 8/1984 | Shibata | 369/45 |
| 4,502,134 | 2/1985 | Kondo et al. | 369/46 |
| 4,544,838 | 10/1985 | Musha et al. | 369/44 |
| 4,564,929 | 1/1986 | Yonezawa et al. | 369/44 |
| 4,589,103 | 5/1986 | Tajima | 369/46 |
| 4,593,386 | 6/1986 | Kuwabara et al. | 369/46 |
| 4,616,354 | 10/1986 | Yoshida | 369/44 |

FOREIGN PATENT DOCUMENTS 3301787 8/1983 Fed. Rep. of Germany .

OTHER PUBLICATIONS

Bolthuis et al., "Ten Billion Bits on a Disk", IEEE Spectrum, vol. 16, No. 8, Aug. 1979, pp. 26–33.

*Primary Examiner*—Donald McElheny, Jr.
*Attorney, Agent, or Firm*—Antonelli, Terry & Wands

[57] ABSTRACT

A tracking servo system using an optical disc with guide grooves formed thereon for a plurality of tracks each having a plurality of interrupting portions, wherein a tracking signal is detected from the diffracted light of a beam spot irradiated to the optical disc and reflected from the guide groove, then the tracking signal is corrected by a signal component included therein and obtained from the interrupting portions, and the track is traced by the use of such corrected signal and the tracking signal.

8 Claims, 6 Drawing Sheets

METHOD AND APPARATUS FOR TRACKING SERVO SYSTEM

BACKGROUND OF THE INVENTION

The present invention relates to a tracking servo system for tracing the center of a track by a light spot and, more particularly, to a push-pull tracking servo system based on a differential diffraction method which traces a track by utilizing diffracted light obtained therefrom. The present invention is adapted for use in an optical code data memory of a recordable/reproducible adding type or erasable type optical disc system.

In the conventional optical information recording and reproducing apparatus, there is known one example as disclosed in U.S. Pat. No. 3,909,608, wherein a tracking signal for tracing a desired track is produced by differentially processing the outputs of two photodetectors which are disposed in parallel with the track and sense the diffracted light obtained from the track. However, since the photodetectors are disposed in the far field of the diffracted light, a disadvantage has been existent heretofore that, if a light beam is deflected or a disc is tilted, an offset is generated in the tracking signal to eventually fail in achieving a proper tracking operation.

In a tracking signal detector utilizing such diffracted light, correction of any offset generated in the tracking signal due to the tilt of the disc can be executed by one known method disclosed in Japanese patent Laid-open No. 59-19250 (U.S. patent application Ser. No. 515,520 filed on July 20, 1983, now U.S. Pat. No. 4,663,751), according to which mirror areas are provided in the track. This prior art comprises extracting a mirror-area signal included in the tracking signal and then applying such extracted signal to correct the offset derived from the tilt of the disc. In the above method, however, the object resides merely in correction of the offset caused by the tilt of the disc.

SUMMARY OF THE INVENTION

It is an object of the present invention to provide an improved method and apparatus capable of performing proper optical tracking with enhanced stability.

For the purpose of achieving the object mentioned above, the feature of this invention resides in extracting both a mirror-area signal included in the tracking signal and another signal immediately before arrival at the mirror area, then correcting the offset due to the tilt of the disc by the former signal, and increasing the gain in a lower range of the tracking servo loop by the latter signal.

According to another feature of this invention, the above-described offset correction is executed not continuously but selectively in conformity with the detected offset value.

DESCRIPTION OF THE PREFERRED EMBODIMENTS

Figure 1:
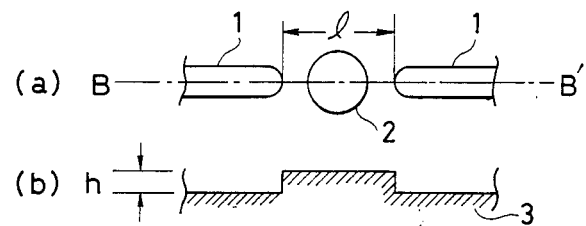
FIGS. 1 through 4 (a) and (b) illustrate an exemplary optical disc used in the present invention.

FIG. 1 illustrates mirror areas of an exemplary optical disc used in the present invention.

The mirror areas are composed of interrupting portions which are defined by partially cutting grooves 1 formed spirally or concentrically along the direction of rotation of the disc. FIG. 1 (a) is a plan view, and FIG. 1 (b) is a sectional view takeh along the line B—B' in (b). Designated at 3 is a disc base having, on the surface thereof, pregrooves and preformat signals in the form of a phase structure. Such disc base is mass-produced by replication from a mother disc with pregrooves and preformat signals recorded thereon. And a reflective recording film (not shown) is formed on the disc surface. The length l of each interrupting portion (in the forward direction of track) is preferably so selected as not to be affected harmfully by the peripheral groove 1 when a beam spot 2 is in the interrupting portion. For example, the length is selected to be greater than the spot size (diameter to obtain a spot intensity of $1/e^2$). Meanwhile, a preferred groove depth h with respect to the length of an optical path is $\lambda/8$ (in which $\lambda$ is the wavelength of a laser beam), but any other value deviating therefrom may also be adapted depending on some other conditions, and it is a matter of course that the shape of the groove is not limited to the embodiment alone.

Figure 2:
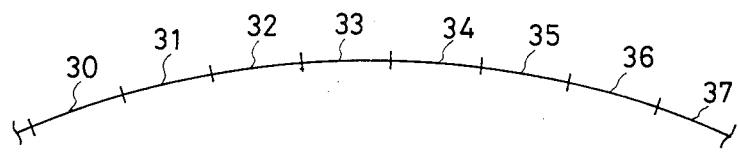
Figure 3:
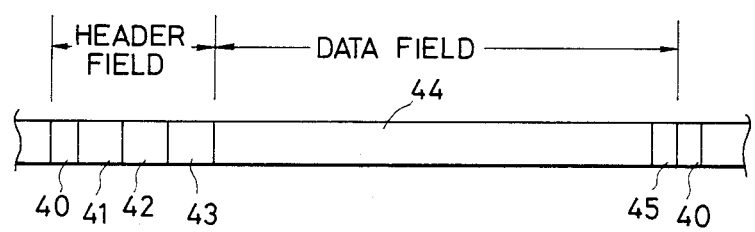

FIG. 2 is a plan view of an exemplary track in an optical disc where digital information is additionally recordable or erasable. For example, the effective region of the optical disc is defined by an outermost circumference of 280 mm in diameter and an innermost circumference of 180 mm in diameter, wherein 32,000 tracks (pregrooves) are recorded previously at a pitch of 1.6 $\mu$m within a radial span of 50 mm. Each track is divided circumferentially into 64 sectors partitioned for information. FIG. 2 illustrates the divisional structure of sectors 30, 31, 32, 33, 34, 35, 36 and 37 of one track, and the further detailed structure of, e.g. sector 34 is illustrated in FIG. 3. Each sector consists of a header field with a preformal signal prerecorded therein and a data field prepared for a user to record information. In the header field, there are sequentially arrayed a sector mark 40 for detecting the head of each sector, a signal 41 for operating a circuit (normally a phase locked loop PLL) to generate clock pulses for detection of address data (track number and sector number), and address data 42. The above three signals are previously recorded in the form of a phase structure with pits. The word "previously" is defined here to mean "before the recording time" at which the user records information in the data field. Preferably such pits are formed in the mother disc at the time of manufacture and are produced by replication. A gap 43 is formed anterior to a recording field 44 so as to provide a temporal allowance until start of a recording mode after detection of the information signal and is therefore not recordable effectively. A buffer field 45 serves to absorb any increase of the recording field that may be caused by rotational variation, clock jitter and so forth.

Figure 4:
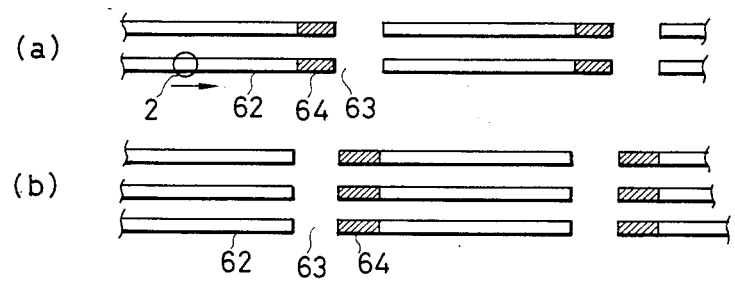

In the above additionally recordable or erasable optical disc, a preferred region for insertion of the aforesaid mirror areas is a field not alloted to recording of information. Therefore the gap 43 or the buffer field 45 is suited for such purpose. According to the present invention, it is a matter of course that the preferred region is not restricted by the above sector structure, and any other field may be selected if no particular problem arises in data processing. FIG. 4 (a) illustrates an example where mirror areas 63 are disposed in the gap 43 of FIG. 3, and guide grooves or tracks 62 are intermittently separated by the mirror areas 63. Designated at 64 is a portion for the header signal such as sector mark. FIG. 4 (b) illustrates another example where mirror areas 63 are disposed in the buffer field 45 of FIG. 3. A desired reflective recording film is formed on the disc base having the guide tracks 62 and the header signal 64 in the form of a phase structure. As regards the recording film, a Te-based material such as TeSePb is adapted for use in an ablative recording mode. Meanwhile, a vertically magnetizable film of TbFe-based material such as TbFeCo is used in a magneto-optical recording mode, and an amorphous film composed of Te-based material is used in a phase change recording mode. The light beam irradiated to the mirror areas 63 is reflected therefrom substantially entirely. Since the offset component alone of the tracking signal appears in the mirror areas, such offset component is detected and held to correct the tracking signal.

How to detect the mirror areas will now be described below.

A first method for detection of the offset is carried out in a real-time operation. Initially it is necessary to sense the existence of a beam spot at the position of the mirror area. This can be achieved by reading out the data recorded on the optical disc and then monitoring the signal posterior to conversion to a digital signal. In the case of an additionally recordable or erasable optical disc, the time interval from the sector mark to the field with the inserted mirror areas is previously known, so that the above may be achieved by first sensing the sector mark, then measuring the time and detecting the arrival of the beam spot at the field with the mirror area.

Thus, according to the method mentioned, the tracking signal corresponding to the differential output of the photodetectors is sampled and held synchronously with the detection effected by the above means, hence detecting and holding the offset component.

Figure 5:
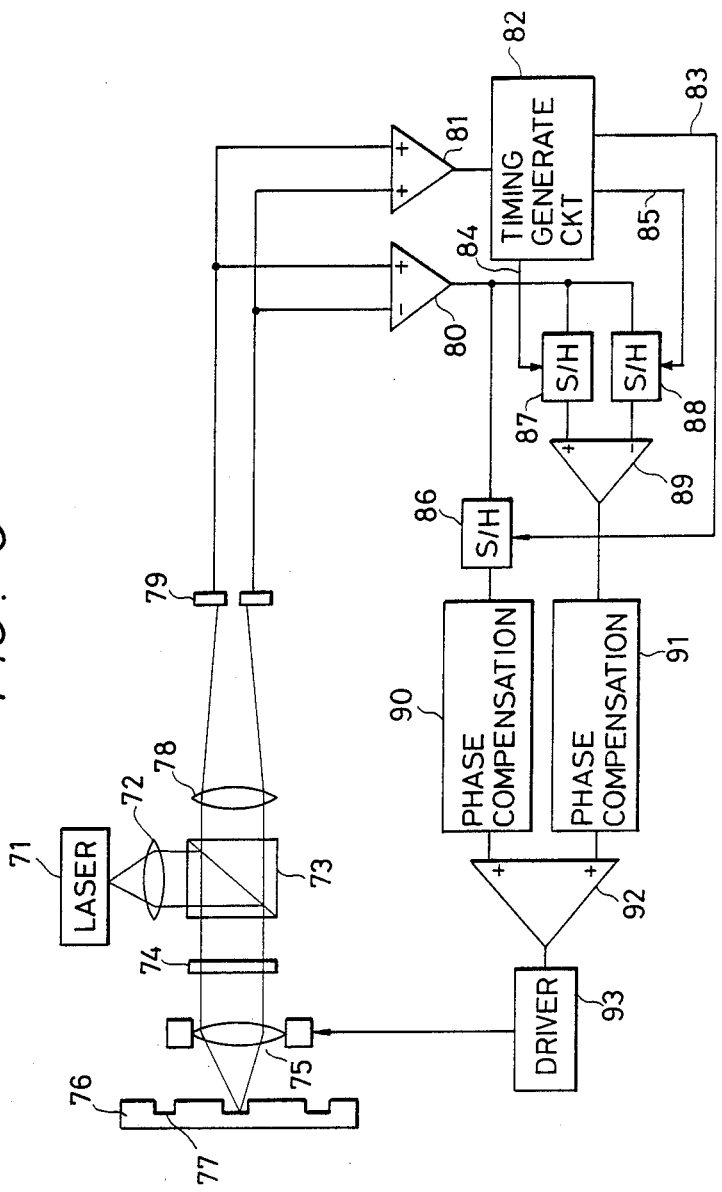
FIG. 5 is a block diagram of an embodiment of the present invention.

FIG. 5 is a block diagram of an embodiment of the present invention in an exemplary case of its application to an additionally recordable optical disc apparatus.

In the diagram, a light beam emitted from a laser source 71 such as a semiconductor laser is rendered parallel by a lens 72 and is passed through a beam splitter (e.g. polarizing prism) 73, a $\lambda/4$ plate 74 ($\lambda$: laser wavelength) and a convergent lens 75 for focusing the light beam to form a spot of 1 $\mu$m in diameter on a disc 76 which has guide grooves or tracks interrupted intermittently by mirror areas. The disc 76 is covered with an evaporated reflecting film or recording film, so that the light beam incident upon the track 77 is reflected therefrom and then is introduced to a data detecting system by way of the convergent lens 75, $\lambda/4$ plate 74 and beam splitter 73 again. The data detecting system comprises a condenser lens 78 and a photodetector 79 whose light sensitive surface to detect a track signal and a data signal is divided into two. (An automatic focus detecting system is not shown.)

The light head is equipped with a focal-error detecting optical system to detect a focal error signal, but this element is omitted here as it is not concerned directly with the present invention. An example of such focal-error detecting system is disclosed in U.S. Pat. No. 4,450,547.

Figure 6:
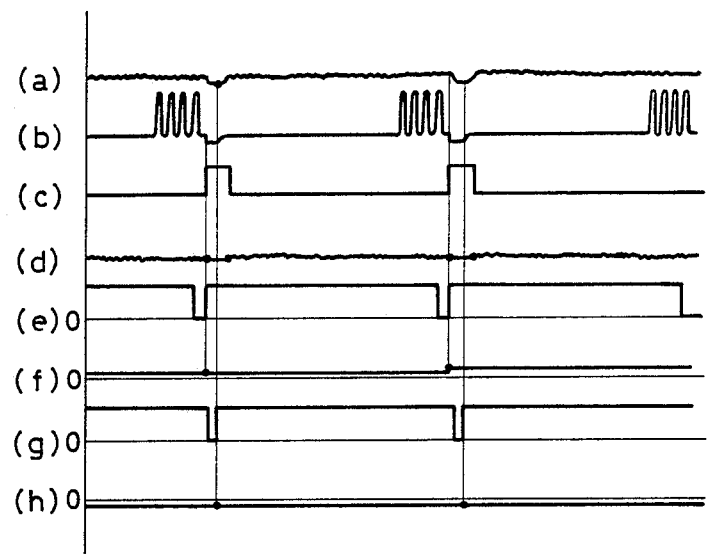
FIGS. 6 (a)–(b) and 7 graphically show the operation performed in the embodiment of FIG. 5.

The guide track 62 has a depth of $\lambda/8$ or so, and since the diffracted light distribution is varied in accordance with the positional relation of the incident spot upon the guide track 62, such variation is sensed by the two-divided photodetector 79, and the respective signals are processed differentially by a differential amplifier 80 to obtain a tracking signal. FIG. 6 shows the waveforms of output signals from the individual circuits. The output of the differential amplifier 80 in FIG. 6 (a) corresponds to a tracking signal $\Delta TR$. Since this signal includes a lower-range error $\Delta TR_{DC}$, a higher-range error $\Delta TR_{AC}$ and an offset $\delta$ resulting from the tilt of the disc, it is expressed as $\Delta TR = \Delta TR_{DC} + \Delta TR_{AC} + \delta$. FIG. 6 (b) shows a reproduced signal obtained by adding the outputs of the two-divided photodetector 79 in an adder 81, and the waveform of the mirror areas can be detected as well as that of the header including the sector mark and so forth. The reproduced signal is inputted to a timing generate circuit 82, which then produces timing signals 83, 84 and 85 for sampling and holding individual signals. The timing signal 83 shown in FIG. 6 (c) is used for correcting the mirror areas appearing in the tracking signal. The temporal relation is such that the tracking signal immediately before arrival at the mirror areas is held by a sample-and-hold circuit 86 and is released posterior to the mirror areas. FIG. 6 (d) shows the tracking signal obtained by such processing. The timing signal 84 shown in FIG. 6 (e) is used for sampling, in response to each sector mark, the tracking signal immediately before arrival at the mirror areas and, when the tracking signal is held by a sample-and-hold circuit 87 synchronously with the timing signal 84, a signal of FIG. 6 (f) is obtained. This signal comes to include the components $\Delta TR_{DC} + \delta$ of the tracking signal $\Delta TR$. FIG. 6 (g) shows another timing signal 85 used for sampling the mirror areas in the tracking signal and, when the tracking signal is held by a sample-and-hold circuit 88 synchronously with the timing signal 85, a signal of FIG. 6 (h) is produced. The signal thus obtained comes to include the offset $\delta$ caused by the tilt of the disc and contained in the tracking signal $\Delta TR$. The outputs of the sample-and-hold circuits 87 and 88 become $(\Delta TR_{DC} + \delta) - \delta = \Delta TR_{DC}$ when processed differentially by the differential amplifier 89, so that the component $\Delta TR_{DC}$ is obtained out of the tracking signal corrected with respect to the offset resulting from the disc tilt. The output of the sample-and-hold circuit 86 is passed through a phase compensation circuit 90 while the output of the differential amplifier 89 is passed through another phase compensation circuit 91, and then the two outputs are added to each other by an adder 92. In this stage, relative to the transfer function G1 of the sample-and-hold circuit 86 and the transfer function G2 of the differential amplifier 89, a lower-range gain of the transfer function G2 including the lower-range component is set to be higher by 20 to 40 dB than the transfer function G1 of the normal tracking signal, as shown graphically in FIG. 7. It is preferred that the crossover frequency of the two functions G1 and G2 be selectively set at 100 to 200 Hz. The tracking signal thus obtained posterior to the adder 92 is introduced to a lens driver 93, which then displaces the lens 75 in the radial direction of the disc to trace the track. By establishing the transfer characteristic as plotted in FIG. 7, the offset resulting from the disc tilt can be corrected to eventually enhance the lower-range gain, hence realizing stable tracking. Although the above embodiment has been described with regard to a case of tracing a track with displacement of the lens, the same effect is also attainable in tracing a track with a light beam deflected by a mirror.

Figure 8:
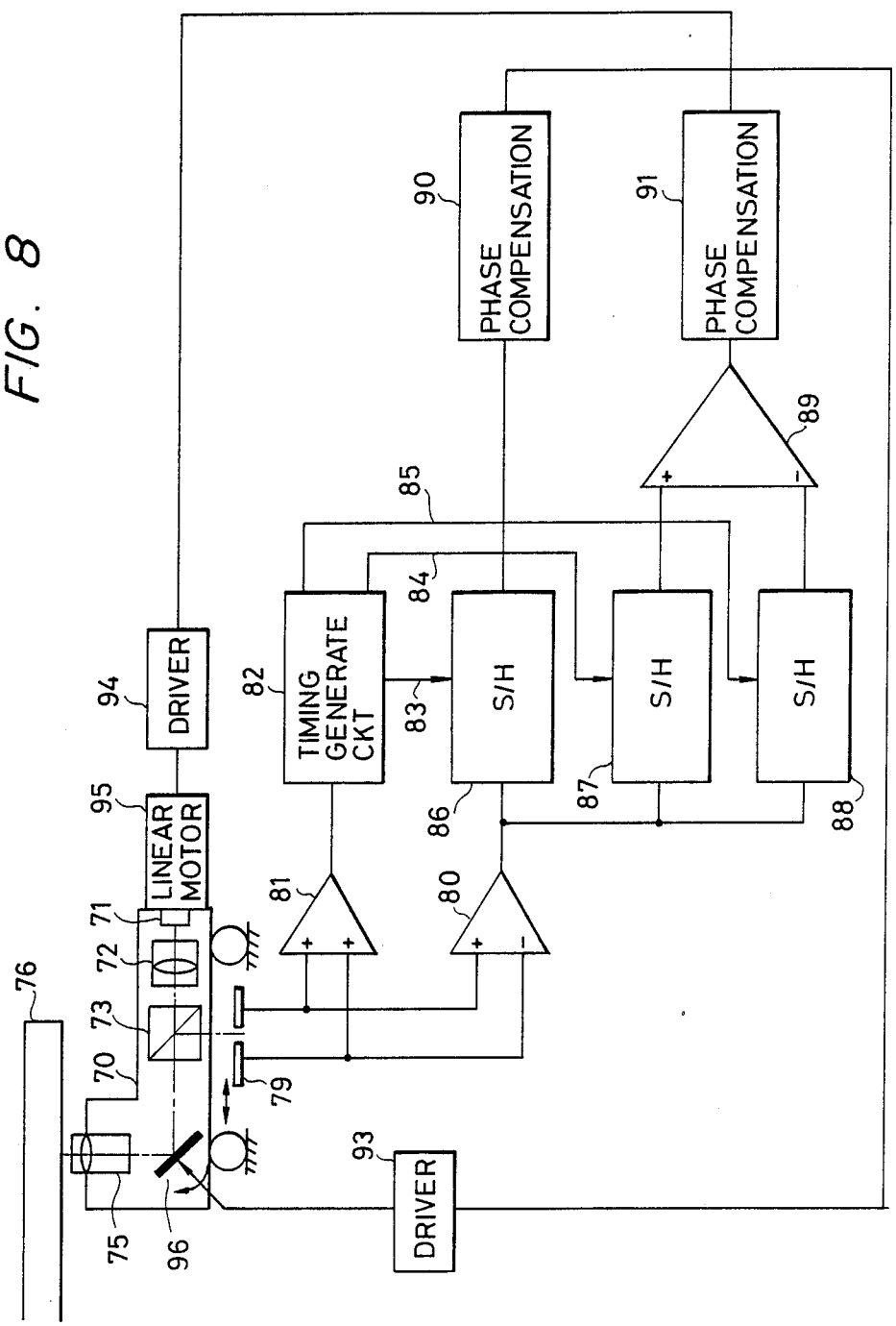
FIG. 8 is a block diagram of another embodiment of the invention.

Hereinafter another embodiment of the present invention will be described with reference to FIG. 8.

There is known a two-stage tracking servo system which, as disclosed in Japanese patent Laid-open No. 58-91536, performs tracking by displacing the entire optical head as a coarse actuator and exciting the aforesaid lens or mirror as a fine actuator. FIG. 8 shows an exemplary case of applying the present invention to such two-stage tracking servo system, wherein the entirety of an optical head 70 is displaced radially by a linear actuator 95 for fast access while the track is traced with respect to the eccentricity by using the lower-range component of the tracking signal. Since the component elements of the optical head and the electric elements are represented by the same reference numerals as those shown previously in FIG. 5, a repeated explanation for any common parts is omitted here. Although in this figure the two-divided photodetector 79 is disposed outside of the optical head 70, it is practically located inside of the head 70 in an actual mechanism. In FIG. 8, the output signal of a sample-and-hold circuit 86 corrected with respect to mirror areas in the tracking signal is passed through a phase compensation circuit 90 and then is introduced to a driver 93 for a fine actuator, thereby driving a mirror 96 (or lens) in the optical head. Meanwhile the output signal of a phase compensation circuit 91 including a lower-range component of the tracking signal is introduced to a driver 94 for a coarse actuator, thereby driving a linear actuator 95 to execute two-stage tracking servo. The lower-range gain can be increased by selecting the transfer function G1 of the mirror driving system and the transfer functtion G2 of the linear-actuator driving system in such a manner as to establish the relationship of FIG. 7, whereby stable tracking is realized.

Figure 9:
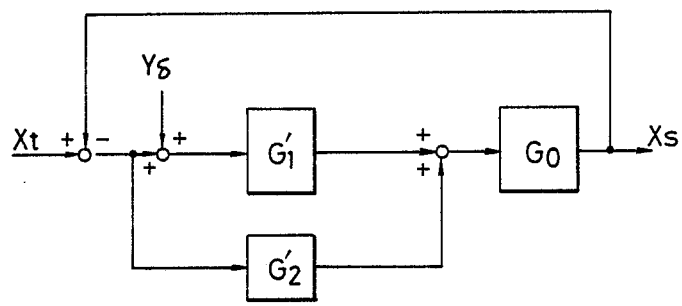
FIG. 9 is a block diagram of a control system.

The operation of the tracking servo system will now be described below with reference to the embodiment. A block diagram of the tracking servo system constituted as mentioned above is shown in FIG. 9, where $G1'$ is the transfer function of the electric system posterior to detection of the tracking error signal, and $G2'$ is the transfer function of the electric system posterior to cancel of the offset effected in the mirror areas. Meanwhile, $G_0$ is the transfer function of the actuator. Accordingly, in the above embodiment, $$G1 = G1' \times G_0$$

$$G2 = F2' \times G_0$$

The track offset such as disk tilt and so forth is denoted by $\delta$. The relationship between the motion $x_t$ of the track and the motion $x_s$ of the spot is given by $$\frac{x_s}{x_f} = \frac{(G1 + G2)}{1 + (G1 + G2)} + \frac{G1}{1 + (G1 + G2)}\left(\frac{\delta}{x_f}\right)$$

The first term represents the closed loop characteristic of an ordinary control system, and the second term represents the residual component of the track offset such as disc tilt. Although reduction of G1 may be effective to decrease the second term, such means is not applicable as it deteriorates the follow-up capability of the entire tracking system. It is necessary to decrease the second term while maintaining the value of G1 unchanged.

Considering that the frequency component of the offset $\delta$ is mostly derived from the disc tilt and the spot deviation, it is approximately several times the rotation frequency of the disc. Therefore the requirement is satisfied if the second term is restricted within the above frequency band. Consequently, with respect to G2, the effect of such restriction is not great unless the gain in the above frequency band is sufficiently high in comparison with G1. Thus the frequency characteristic should be such as shown in FIG. 7.

Supposing now that the transfer functions are in the relationship $$\frac{G1}{1 + (G1 + G2)} \simeq \frac{1}{G3},$$

Figure 7:
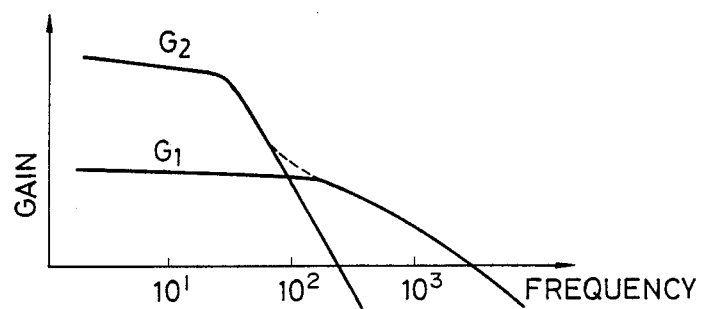

G3 is defined as a region enclosed with G1 and G2 in FIG. 7. Accordingly, the lower limit in restriction of the frequency is the intersection of G1 and G2. This frequency may be determined in accordance with the offset value.

In order to attain the characteristic of FIG. 7 with regard to G2, the transfer function needs to have a steep slope. It is therefore preferred that the characteristic similar to that of a secondary low-pass filter or the like be established relative to $G2'$ (in view of the sampling characteristic). The above-described block of the control system is not limited to the case of employing a single actuator alone, and the same effect is achievable in using two actuators as well. However, $G_0$ becomes equal to 1 in the latter case, and the respective transfer characteristics of two actuators come to be included in $G1'$ and $G2'$.

The constitution of the tracking servo control system according to the present invention is not limited to the embodiment that cancels the offset by the use of mirror areas, and it is applicable also to the method disclosed in Japanese patent Laid-open No. 59-38939 wherein pits are formed in grooves of a depth of $\lambda/8$ by intermittently prewobbling the tracks, and a true tracking deviation not depending on any disc tilt is sampled from such pits so as to be used for correction of the diffracted-light tracking error signal. In this case, the output of the differential amplifier 89 shown in FIG. 5 can be detected directly by sampling a signal from the prepits, so that the same structure as that of the embodiment of FIG. 5 or 8 can be applied to the subsequent processing.

Figure 10:
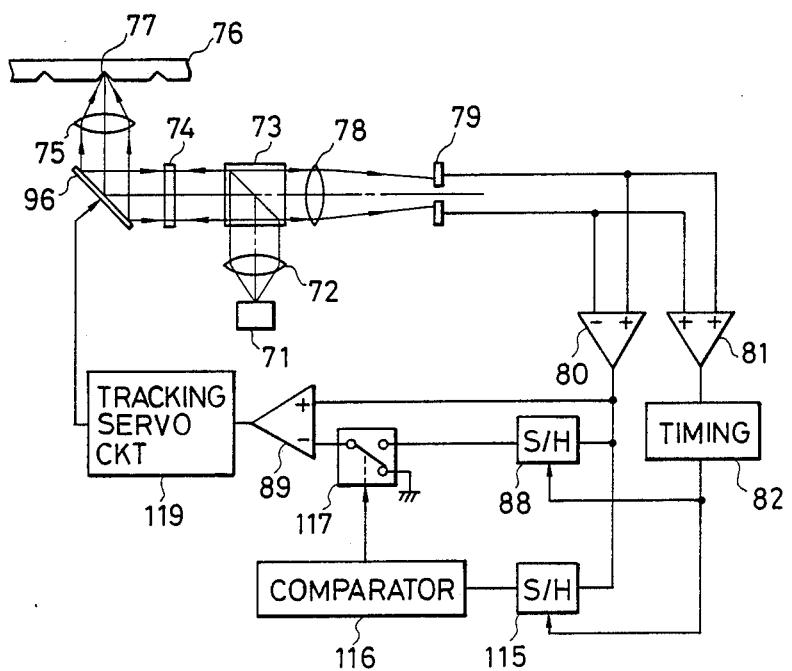
FIG. 10 is a block diagram of a further embodiment of the invention.

Now a further embodiment of the present invention will be described below with reference to FIG. 10. A light beam emitted from a laser source 71 such as a semiconductor laser is rendered parallel by a condenser lens 72 and then is reflected at a polarizing prism 73, whereby the light beam is passed through a $\frac{1}{4}$ wavelength plate 74 and a galvano mirror 96, and then is focused on a disc 76 through a convergent lens 75. The disc has spiral or concentric guide grooves 77 formed thereon in a depth of $\lambda/8$ (in which $\lambda$ is the wavelength of a recording and reproducing laser). As mentioned above, the guide grooves 77 are intermittently interrupted by mirror areas. The tracking signal processed by a differential amplifier 80 includes both a tracking error detection component and an offset component derived from the disc tilt and the photodetector deviation, but in the stage concerned with the mirror areas, the tracking signal includes merely the offset component alone induced by the disc tilt and the photodetector deviation. Therefore the offset component can be eliminated by correcting the tracking signal through detection of the mirror-area signal level in a sample-and-hold circuit 88, whereby normal tracking is rendered possible. This embodiment is so contrived as to execute the offset correction merely when the offset exceeds an allowable value. In case the offset induced in the tracking signal is within an allowable tracking error range, the recording or reproducing characteristic is not affected. Accordingly no correction is required unless the offset exceeds the allowable value. And in order to diminish the possibility of causing unstable tracking by any abnormality of the mirror areas provided for correction, the correcting operation is interrupted in this embodiment if the offset is smaller than the allowable value, and such operation is performed merely when the offset exceeds the said value.

Figure 11:
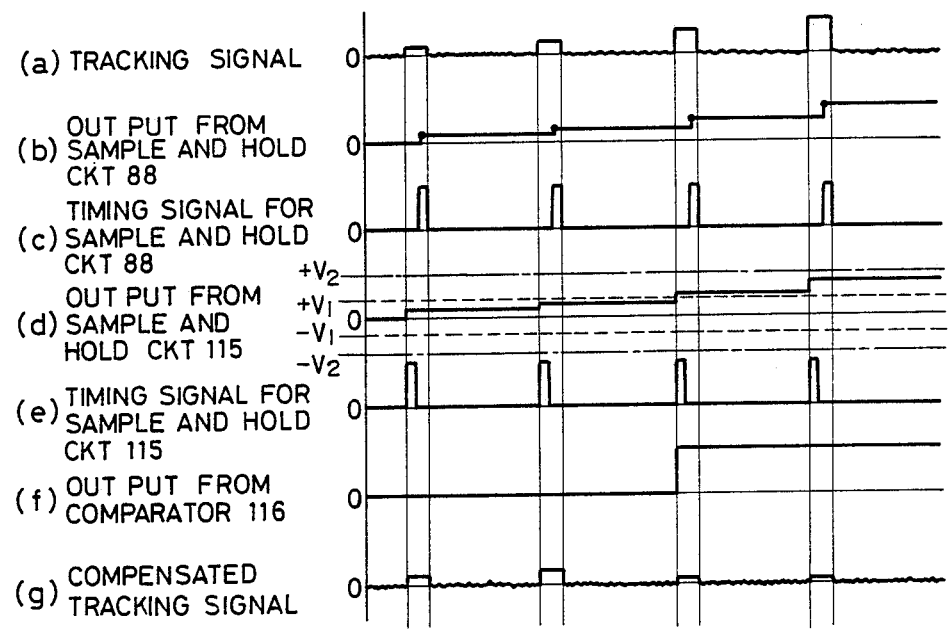
FIGS. 11 (a)–(g) graphically show signal waveforms for explaining the operation performed in FIG. 10.

For achieving the purpose mentioned, another sample-and-hold circuit 115 is disposed for detecting the allowable offset value in addition to the aforesaid sample-and-hold circuit 88 used for detection of the signal level in the mirror areas, and there are further provided a comparator 116 for finding from the output of the sample-and-hold circuit 115 whether the offset has exceeded the allowable value, and a switch 117 for selectively connecting or disconnecting the offset value for correction. The operations of such elements will be described below with reference to FIG. 11, wherein (a) is a tracking signal with a mirror-area level including offset components at equal intervals (shown on an exaggerated scale for emphasizing the effect), and (b) is an output from the sample-and-hold circuit 88. An output (c) from the timing generate circuit 82 includes the detected mirror-area level corresponding to the offset, and (d) is an output from the sample-and-hold circuit 115. A signal (e) from the timing generate circuit 82 also includes the detected mirror-area level similarly to the signal (b), but generation of the timing signal (e) is so selected as to be slightly anterior to that of (c). In this manner the offset component can be switched with certainty. Together with the signal (d), a comparator level corresponding to the allowable offset value in the comparator 116 is also shown by a dotted line. Therefore, upon excess of the comparator level over the allowable offset value, the comparator level becomes high as shown in (f), so that the switch 117 connected to the ground or off-position relative to the offset correction is turned on to start the correction. The tracking signal and the offset component on-off controlled selectively by the switch 117 in accordance with the offset value are processed differentially by the differential amplifier 89 to produce a corrected tracking signal as shown in (f). This signal is introduced to the control circuit 119 including both a phase compensation circuit and a drive circuit, and then the galvano mirror 96 is driven to trace the track.

Figure 12:
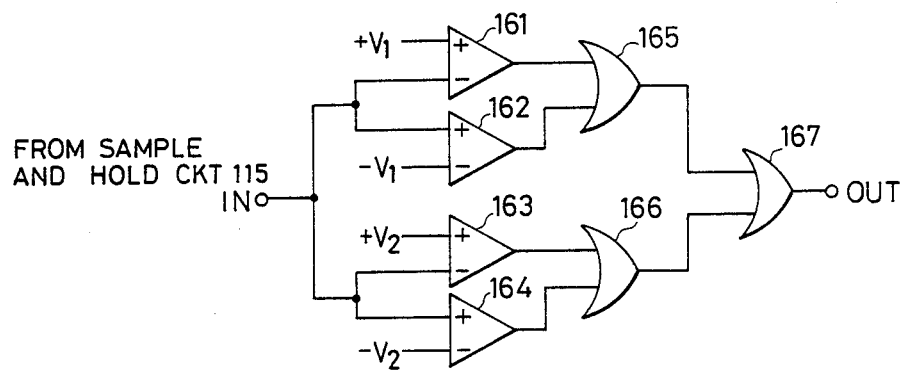
FIG. 12 illustrates the structure of a comparator 116 employed in FIG. 1.

Since the offset component has positive and negative polarities, it is preferred that the comparator 116 be of a wind type consisting of two comparators. One example thereof is shown in FIG. 12, where two wind comparators are employed. First wind comparators 161 and 162 decide whether the offset is smaller than the allowable value, while second comparators 163 and 164 detect any abnormal level that may be caused by defective mirror areas or the like. The first and second wind comparators have comparison levels $+V1$, $-V1$ and $+V2$, $-V2$ respectively, and logic elements 165, 166 and 167 are OR circuits which produce logical sums. The provision of the second wind comparators places the apparatus out of operation upon occurrence of any fault, thereby realizing elimination of instability in the tracking that may be induced by such fault.

In addition to the foregoing example of employing mirror areas in the track, similar effect is also attainable in another correction method that utilizes prepits having slight positional deviation from the center of the track.

In the embodiment of FIG. 5 or 6, the structure may be so modified as to dispose a switch 117 between the sample-and-hold circuit 88 and the differential amplifier 89, and further to provide a sample-and-hold circuit 115 for detection of the offset value and a comparator 116, wherein the switch 117 is controlled in accordance with the output of the comparator 116.

According to the exemplary embodiment of the present invention mentioned above, the operation of correcting the offset component included in the tracking signal is performed merely when such offset has exceeded an allowable value, hence diminishing the tracking instability concomitant with abnormality of the correction.

Although the above description has been given in connection with an additionally recordable type optical disc, the same effect is achievable also with regard to an erasable optical disc having a similar format. Besides the foregoing example where a recording field is formed on a guide track, the same effect can be attained in another example as well where a recording field is formed on a flat portion between guide tracks. In the latter case, however, the header including a sector mark and so forth is located also on the flat portion between the guide tracks.

What is claimed is:

1. A method for tracking a guide groove of an optical disc wherein the optical disc has guide grooves formed thereon as a plurality of tracks, each guide groove having a plurality of interrupting portions, the method comprising the steps of:
   irradiating a light spot onto a guide groove of said optical disc;
   detecting a first tracking signal from light diffracted and reflected by said guide groove;
   detecting a signal component of said first tracking signal obtained from said interrupting portions;
   detecting another signal component of said first tracking signal immediately before arrival at said interrupting portions;
   producing a second tracking signal by differentially processing said signal component obtained from said interrupting portions and said another signal component; and
   controlling the projection position of said light spot in accordance with said first tracking signal and said second tracking signal, said second tracking signal having a gain thereof set to be greater than a lower-range gain of said first tracking signal.

2. The method as defined in claim 1, further comprising the steps of adding said first tracking signal and said second tracking signal and controlling the projection position of said light spot in accordance with the result of the addition.

3. The method as defined in claim 1, further comprising the steps of driving a fine actuator in accordance with said first tracking signal and driving a coarse actuator in accordance with said second tracking signal.

4. An apparatus for tracking a guide groove of an optical disc wherein the optical disc has guide grooves formed thereon as a plurality of tracks, each guide groove having a plurality of interrupting portions, the apparatus comprising:
   means for irradiating a light spot onto a guide groove of said optical disc;
   first means for detecting a first tracking signal from light diffracted and reflected by said guide groove;
   second means coupled to said first means including means for detecting a signal component of said first tracking signal obtained from said interrupting portions, means for detecting another signal component of said first tracking signal immediately before arrival at said interrupting portions, and means for producing a second tracking signal by differentially processing said signal component obtained from said interrupting portions and said another signal component; and
   tracking means for controlling the projection position of said light spot to trace the guide groove in accordance with the first tracking signal and said second tracking signal, said second tracking signal having a gain thereof set to be greater than a lower-range gain of said first tracking signal.

5. The apparatus as defined in claim 4, further comprising adding means for adding said first tracking signal and said second tracking signal, said tracking means being responsive to said adding means.

6. The apparatus as defined in claim 4, wherein said tracking means includes a first actuator coupled to said first means and driven in accordance with said first tracking signal, and a second actuator coupled to said second means and driven in accordance with said second tracking signal.

7. A method for tracking a guide groove on an optical diso wherein the optical disc has guide grooves formed thereon as a plurality of tracks, each guide groove having a plurality of interrupting portions, the method comprising the steps of:
   irradiating a light spot onto a guide groove of said optical disc;
   detecting a first tracking signal from light diffracted and reflected by said guide groove and having a signal component obtained from said interrupting portions;
   determining whether the signal component obtained from said interrupting portions is within a predetermined range;
   correcting said first tracking signal in accordane with the result of the determination; and
   controlling the projection position of said light spot to track the guide groove.

8. An apparatus for tracking a guide groove of an optical disc wherein the optical disc has guide grooves formed thereon as a plurality of tracks, each guide groove having a plurality of interrupting portions, the apparatus comprising:
   means for irradiating a light spot onto a guide groove of said optical disc;
   first means for detecting a first tracking signal from the light diffracted and reflected by said guide groove and having a signal component obtained from said interrupting portions;
   second means coupled to said first means for correcting said first tracking signal by the signal component thereof obtained from said interrupting portions;
   means coupled to said first means for determining whether the signal component obtained from said interrupting portions is within a predetermined range;
   means for controlling the correction of said first tracking signal in accordance with the output of said determination means; and
   tracking means for controlling the projection position of said light spot to track the guide groove.

* * * * *